United States Patent
Lee et al.

(10) Patent No.: US 6,367,011 B1
(45) Date of Patent: Apr. 2, 2002

(54) PERSONALIZATION OF SMART CARDS

(75) Inventors: Alson Lee, Inverness, IL (US); Mary L. Gorden, San Rafael, CA (US)

(73) Assignee: Visa International Service Association, Foster City, CA (US)

(*) Notice: Subject to any disclaimer, the term of this patent is extended or adjusted under 35 U.S.C. 154(b) by 0 days.

(21) Appl. No.: 09/172,722

(22) Filed: Oct. 13, 1998

Related U.S. Application Data

(60) Provisional application No. 60/061,918, filed on Oct. 14, 1997.

(51) Int. Cl.[7] ................................................. G04L 9/00
(52) U.S. Cl. ........................ 713/172; 712/165; 712/168; 380/255
(58) Field of Search .................................. 713/172, 164, 713/165, 168, 200, 201; 380/255, 33, 283

(56) References Cited

U.S. PATENT DOCUMENTS

| | | | |
|---|---|---|---|
| 4,549,075 A | * 10/1985 | Saada et al. .................. | 380/25 |
| 5,311,595 A | * 5/1994 | Bjerrum et al. ............... | 380/25 |
| 5,473,690 A | 12/1995 | Grimonprez et al. | |
| 5,534,857 A | 7/1996 | Laing et al. | |
| 5,557,679 A | 9/1996 | Julin et al. | |
| 5,889,941 A | 3/1999 | Tushie et al. | |
| 6,021,203 A | * 2/2000 | Douceur et al. ............... | 380/49 |

FOREIGN PATENT DOCUMENTS

| | | |
|---|---|---|
| DE | 3927270 | 8/1989 |
| DE | 3927270 | 2/1991 |
| EP | 0723251 | 7/1996 |
| FR | 2575566 | 12/1984 |
| FR | 2638002 | 8/1988 |
| FR | 2638002 | 4/1990 |
| WO | 952810 | 8/1995 |
| WO | 9739424 | 10/1997 |
| WO | 9910848 | 3/1999 |

* cited by examiner

*Primary Examiner*—Thomas R. Pesso
(74) *Attorney, Agent, or Firm*—Beyer Weaver & Thomas, LLP

(57) ABSTRACT

Smart card personalization includes a personalization preparation process prior to the personalization session at the personalization bureau. The personalization preparation process derives the derived card keys for a single or for multiple applications. The preparation process also generates issuer and card public key pairs and certificates. Master keys are used in conjunction with the personalization preparation process rather than utilizing the master keys during the remainder of the personalization process at the personalization bureau. Because the personalization preparation process does not require highly specialized, expensive machinery, it is straightforward for an issuer to derive the card keys at the issuer's location. Once the personalization preparation process is complete, the derived card keys are stored in an output file merged with other card personalization data. The output file contains records of secret and non-secret card data, each record corresponding to personalization information for a single card to be personalized. The output file is sent to the personalization bureau which process the file using standard processing modules to personalize each smart card. The preparation process and the personalization process may be performed at the same location or at different locations.

28 Claims, 5 Drawing Sheets

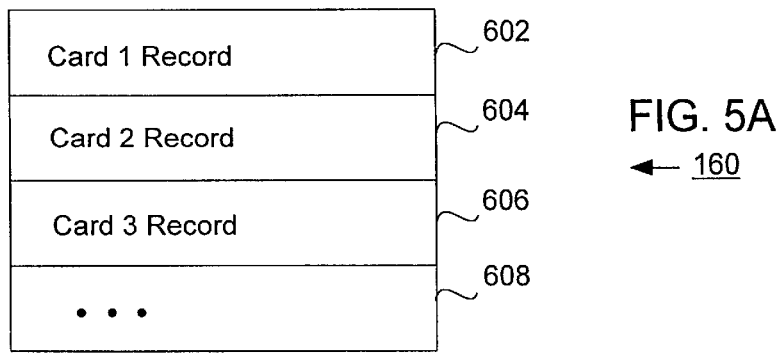
FIG. 5A
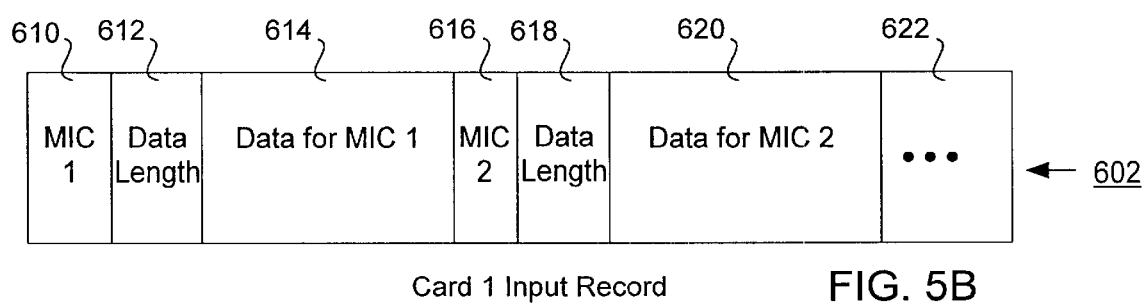
Card 1 Input Record    FIG. 5B
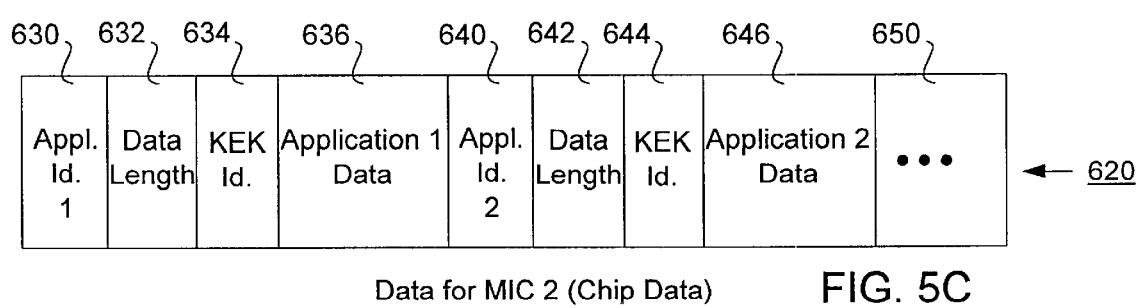
Data for MIC 2 (Chip Data)    FIG. 5C
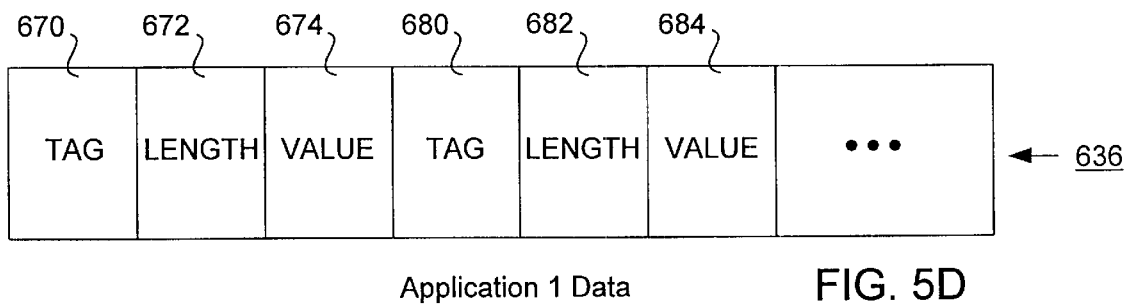
Application 1 Data    FIG. 5D

PERSONALIZATION OF SMART CARDS

This application claims priority of U.S. provisional application No. 60/061,918, filed Oct. 14, 1997, which is incorporated herein by reference.

FIELD OF THE INVENTION

The present invention relates generally to smart cards. More specifically, the present invention relates to a system and method for personalization of smart cards having multiple applications.

BACKGROUND OF THE INVENTION

Before a smart card is issued to a cardholder, the card goes through an initialization and a personalization process. During the initialization process, a manufacturer or other card supplier embeds an integrated circuit chip into the plastic card body. The chip is loaded with at least one application program, such as a credit or a stored value application. In addition, a file structure may be initialized with default values, and initial cryptographic keys may be stored for transport security. After a card is initialized, it is then typically personalized. During personalization, the smart card is generally loaded with data that uniquely identifies the card, and with data that allows the card to be used in a payment system, for example. Personalization data may include file information, application information, a maximum value for an application or of the card and a personal identification number (PIN) or other cardholder information. Also included may be the currency in which the card or application is valid, the expiration date of the card or application, and a variety of cryptographic keys and algorithm information for the card or applications on the card. For certain applications, cryptographic information to be loaded during personalization can include not only a secret card key and derived keys, but also public key certificates. Card life cycle is described in *Financial transaction cards— Security architecture of financial transaction systems using integrated circuit cards, Part 1: Card life cycle*, International Organization for Standardization, ISO 10202-1, 1991, which is incorporated by reference.

Conventionally, the smart card is personalized at a personalization bureau, often a third party contracted by a smart card issuer to personalize their smart cards. The personalization bureau may be in a separate physical location from the location of the smart card issuer or from the location of the entity that performs smart card initialization. During personalization, a personalization device located at the personalization bureau is coupled to a security module. The personalization device generally provides data which, when installed on a card, gives the card the ability to run application programs.

During personalization, cryptographic keys (such as derived card keys) are stored in a memory of the initialized card. These keys are used for a variety of cryptographic purposes. Derived card keys are derived from master keys stored in the security module (of the personalization bureau) using derivation data unique to each card. The derivation data is encrypted with a suitable algorithm using a master key to produce a derived card key for a particular card. The use of the master key to produce derived card keys obviates the need to have a unique key for every card in the system stored in terminals where applications are used. Instead, the master key can be used with derivation data from the card to independently regenerate the derived card key. This allows a terminal and a card to securely communicate with each other while the terminal only needs to hold a small number of master keys to communicate with a large number of cards in a system.

There can be a potential problem with security when using this conventional method of personalization and derived keys. Since all card keys are typically derived at the time of personalization, all of the master keys are required at the personalization device within the personalization bureau. A security issue can arise when the master keys are placed within a third party's control, such as at the personalization bureau. Every additional party who has access to the master keys is a potential breach of security.

Another common problem with conventional personalization is that the personalization process can take a substantial amount of time. In addition to the cost of contracting with third parties to perform the personalization process, the time needed to perform the personalization process adds an additional amount to the total cost of personalization. This results in higher priced cards and systems.

In fact, a major challenge in the implementation of encryption technology (and especially public key technology) in chip cards is in how to achieve significant throughput in the personalization process. It is interesting to note that because personalization is seen as a bottleneck in the overall process, special and costly personalization machines are used that are able to personalize multiple cards at once. With banks having a requirement to issue millions of cards per year, it is imperative that the process be fully optimized. For example, as mentioned briefly above, certain chip card applications require not only a card secret key (for example, the secret key of a card public key pair), but also public key certificates and derived keys that are placed onto the card. Creating such card keys and public key certificates at the point of personalization could severely degrade throughput. For example, a stored value application may require that a smart card be loaded with a card secret key, a card certificate, an issuer certificate, at least three DES keys and other card data. Creating card key pairs at the point of personalization would inhibit throughput.

Furthermore, it is conceivable that one smart card may contain multiple applications. Each application is likely to require its own set of keys, data and algorithms. Personalization throughput would be dramatically affected should each smart card have to be run through a separate personalization process for each application that it contains. Requiring each card to be personalized multiple times is not cost effective.

It would therefore be desirable to provide a system and method for personalizing a smart card such that the issuer's master keys and other secret information can remain secure. It would also be desirable to provide a system and method for personalizing a card such that the time required for the personalization process at the personalization bureau is decreased. It would be further desirable to efficiently personalize smart cards that may have multiple applications stored thereon. The present invention addresses such needs.

SUMMARY OF THE INVENTION

To achieve the foregoing, and in accordance with the purpose of the present invention, a preparation process is disclosed that speeds up the personalization process for smart cards. The process may be used to personalize single or multiple application smart cards. Derived card keys, public key pairs (if any) and public key certificates (if any) are generated in advance. The preparation process creates an output file by merging the generated secret data with card data from other issuer cardholder systems. Advantageously, chip card data is interspersed with other personalization data in a flexible format in the output file. The file is input to the personalization process. Advantageously, the entity performing personalization may then use the output file to personalize all applications on a smart card in one process.

An embodiment of the present invention speeds up the personalization process performed at the personalization bureau by deriving any needed derived card keys prior to the time of personalization at the bureau. Additionally, the present invention provides greater overall security by allowing the issuer to maintain the master keys (or other secret information) at the issuer's location without the need to give the master keys to a personalization bureau or other third party. The present invention is applicable to a wide variety of secret information that an issuer may not wish to divulge to outside parties. By using the secret information at the issuer location to help produce the output file, the secret information need not be divulged to a third party such as a personalizer.

This embodiment of the present invention provides a modified personalization process, which includes a preparation process accomplished after initialization, but prior to the standard personalization session (typically, but not necessarily, occurring at a personalization bureau). The preparation process will generally be carried out at the issuer location, but may be carried out at any location trusted by the issuer. Furthermore, it is contemplated that the preparation process and the personalization session may be performed at the same location. Among other tasks, the preparation process is used to derive the derived card keys for one or more applications to be installed on a card. In this manner, an issuer's master keys are used during the preparation process rather than during the remainder of the standard personalization session at a personalization bureau. Since the preparation process does not require highly specialized, expensive machinery (such as the personalization device) it is relatively simple for an issuer to derive the card keys at the issuer's location. Once the preparation process is complete, the derived card keys may be stored in a file, which can later be sent to the personalization bureau for the remainder of the personalization process.

According to a further embodiment of the present invention, applications in addition to those applications that need derived card keys can also be included in the file to be sent to the personalization bureau. An example of an application that may not need derived card keys is a loyalty application. Loyalty applications are used to keep track of purchases by a cardholder for the purpose of rewarding the cardholder for being a particularly loyal customer. Embodiments of the invention allow data related to multiple applications to be combined in a single file, which can then be sent to the personalization bureau or other entity responsible for personalizing the card. Advantageously, use of a single file to personalize a smart card having multiple applications is efficient and obviates the need for the card to be personalized once for each application.

One embodiment of the present invention for personalizing a smart card includes performing a first portion of a personalization process at a first location (e.g., at a card issuer), including an output of the first portion of the personalization process in an output file, and sending the output file to a second location. The second portion of the personalization process may then be performed at the second location (e.g., at a personalization bureau).

BRIEF DESCRIPTION OF THE DRAWINGS

FIGS. 5A–5D illustrate one possible embodiment of a format for an output file.

DETAILED DESCRIPTION

Figure 1:
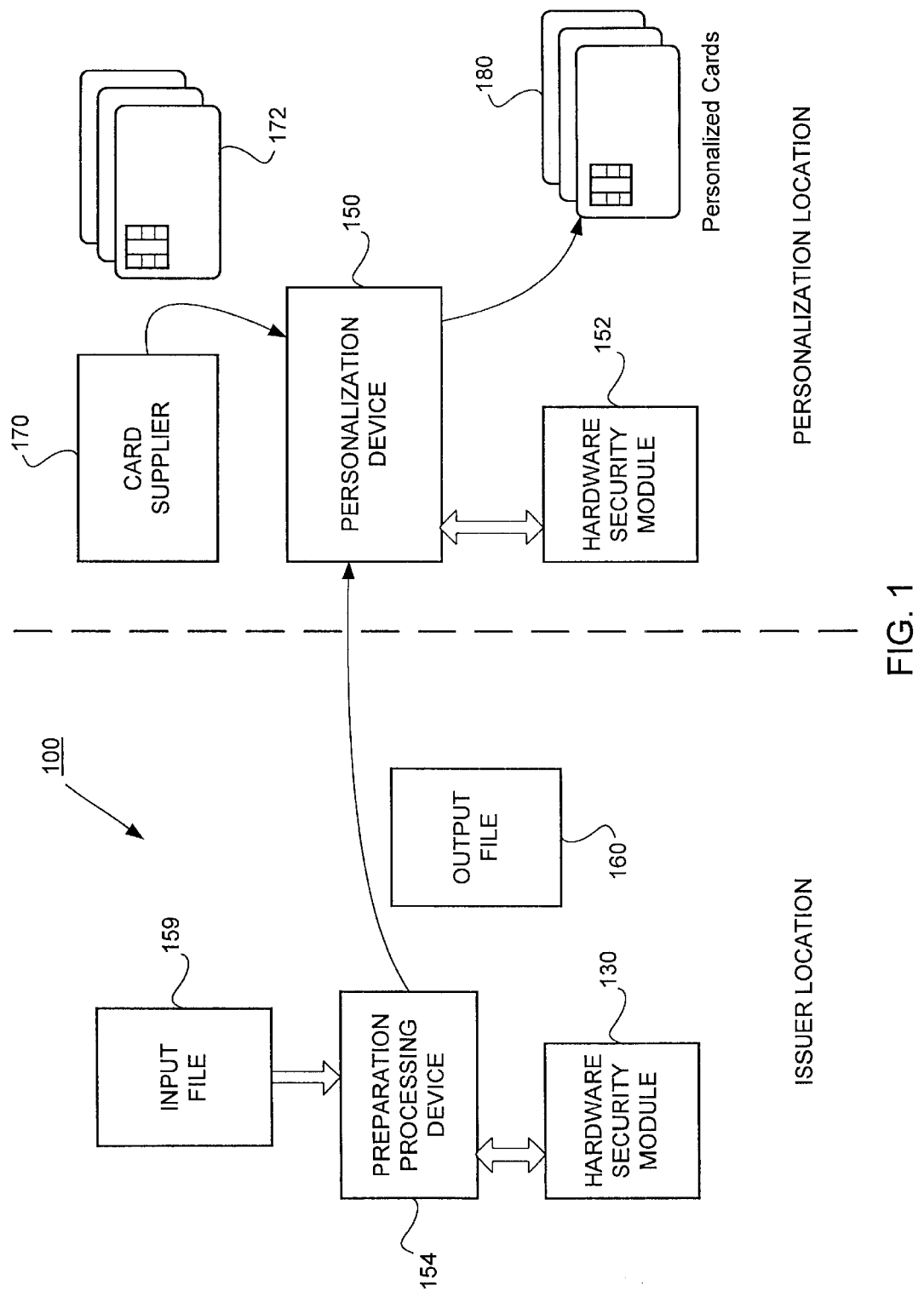
FIG. 1 is a block diagram of a system for personalization of a smart card according to one embodiment of the present invention.

As mentioned above, the life cycle of a smart card begins with the manufacture of the chip, and its mounting into a card body by a card manufacturer or card supplier. Once initialized, a batch of cards is shipped to a personalizing entity who performs personalization of the cards. Data is received from the card issuer for use in personalizing each card. Personalization of each card depends upon the application for which the card is intended, but may include: addition of secret keys, addition of application specific data and parameters, embossing, addition of graphic images, addition of magnetic stripe data, etc. The present invention is directed toward the interaction between the issuer and personalization entity, and addresses a need to streamline the personalization process for high volumes of cards, and especially when multiple applications are in use. By way of background, smart cards are first discussed in general.

Smart Cards

The present invention is applicable to smart cards. Also termed chip cards, integrated circuit cards, memory cards or processor cards, a smart card is typically a credit card-sized plastic card that includes one or more semiconductor integrated circuits. A smart card can interface with a point-of-sale terminal, an ATM, or with a card reader integrated with a computer, telephone, vending machine, or a variety of other devices. The smart card may be programmed with various types of functionality such as a stored-value application, a credit or debit application, a loyalty application, cardholder information, etc. Although a plastic card is currently the medium of choice for smart cards, it is contemplated that a smart card may also be implemented in a smaller form factor, for example, it may attach to a key chain or be as small as a chip module. A smart card may also be implemented as part of a personal digital assistant, telephone, or take a different form. The below description provides an example of the possible elements of a smart card, although the present invention is applicable to a wide range of types of smart cards.

A smart card may include a microprocessor, random access memory (RAM), read-only memory (ROM), non-volatile memory, an encryption module (or arithmetic unit), and a card reader (or terminal) interface. Other features may be present such as optical storage, flash EEPROM, FRAM, a clock, a random number generator, interrupt control, control logic, a charge pump, power connections, and interface contacts that allow the card to communicate with the outside world. Of course, a smart card may be implemented in many ways, and need not necessarily include a microprocessor or other features.

The microprocessor is any suitable central processing unit for executing commands and controlling the device. RAM serves as temporary storage for calculated results and as stack memory. ROM stores the operating system, fixed data, standard routines, look up tables and other permanent information. Non-volatile memory (such as EPROM or EEPROM) serves to store information that must not be lost when the card is disconnected from a power source, but that must also be alterable to accommodate data specific to individual cards or changes possible over the card lifetime. This information includes a card identification number, a personal identification number, authorization levels, cash balances, credit limits, and other information that may need to change over time. An encryption module is an optional hardware module used for performing a variety of encryption algorithms. Of course, encryption may also be performed in software. *Applied Cryptography*, Bruce Schneier, John Wiley & Sons, Inc., 1996 discusses suitable encryption algorithms and is hereby incorporated by reference.

The card reader interface includes the software and hardware necessary for communication with the outside world. A wide variety of interfaces are possible. By way of example, the interface may provide a contact interface, a close-coupled interface, a remote-coupled interface, or a variety of other interfaces. With a contact interface, signals from the integrated circuit are routed to a number of metal contacts on the outside of the card which come in physical contact with similar contacts of a card reader device. A smart card may include a traditional magnetic stripe to provide compatibility with traditional card reader devices and applications, and may also provide a copy of the magnetic stripe information within the integrated circuit itself for compatibility.

Various mechanical and electrical characteristics of a smart card and aspects of its interaction with a card reader device are described in *Smart Card Handbook*, W. Rankl and W. Effing, John Wiley & Sons, Ltd., 1997, and are defined by the following specifications, all of which are incorporated herein by reference: *Visa Integrated Circuit Card Specification, EMV Integrated Circuit Card Specification for Payment Systems, EMV Integrated Circuit Card Terminal Specification for Payment Systems, EMV Integrated Circuit Card Application Specification for Payment Systems*, Visa International Service Association 1996; and *International Standard; Identification Cards—Integrated Circuit(s) Cards with Contacts*, Parts 1–6, International Standards Organization 1987–1995.

Smart Card Personalization

FIG. 1 shows a block diagram of a system 100 for personalization of a smart card according to an embodiment of the present invention. At the issuer location, hardware security module (HSM) 130 is coupled to a preparation processing device 154, which receives an input file 159. At the personalization location, a personalization device 150 is coupled to a hardware security module (HSM) 152. Output file 160 is transferred from the issuer location via transport mechanism 158 to be input to device 150. Card supplier 170 is one of many well known card suppliers that provides initialized smart cards 172 to personalization device 150. Once personalized by device 150 using file 160, personalized cards 180 are available for use by cardholders. It is possible for the issuer location and the personalization location to be the same location.

Hardware security module (HSM) 130 is used to facilitate cryptographic processing. HSM 130 typically stores secret keys and encryption algorithms, performs cryptographic functions on secret data and generates session keys and signatures. As is known in the art, HSM 130 is generally a tamper proof device, which uses some level of physical security measures to protect the sensitive information inside. HSM 130 may be any security module used in the industry, such as a RACAL HSM Model RG7000, or the security box attached to an automatic teller machines (ATM). In alternative embodiments, HSM 130 may be implemented on a smart card within a card reader, on a series of smart cards, may be implemented on any suitably secure computer, or may be implemented in software.

HSM 130 is used either to generate or to store imported master keys such as a master update key, a master load key, a supplier update key, a key encryption key, a key exchange key, the issuer public and secret keys, and the issuer public key certificate. HSM 130 also uses the master keys to generate card specific keys such as a derived load key for each card, a derived update key for each card, the card public and secret keys, and generates the card public key certificate. HSM 152 is a similar device to HSM 130. HSM 152 is used to decrypt secret data in output file 160 using a key encryption key, and to encrypt the secret data under a key known to the card (for example, a session key) prior to sending it to the card for personalization. HSM 152 also uses a supplier update key to unlock cards received from the card supplier. Further use of HSM 130 and HSM 152 will be described below.

Figure 6:
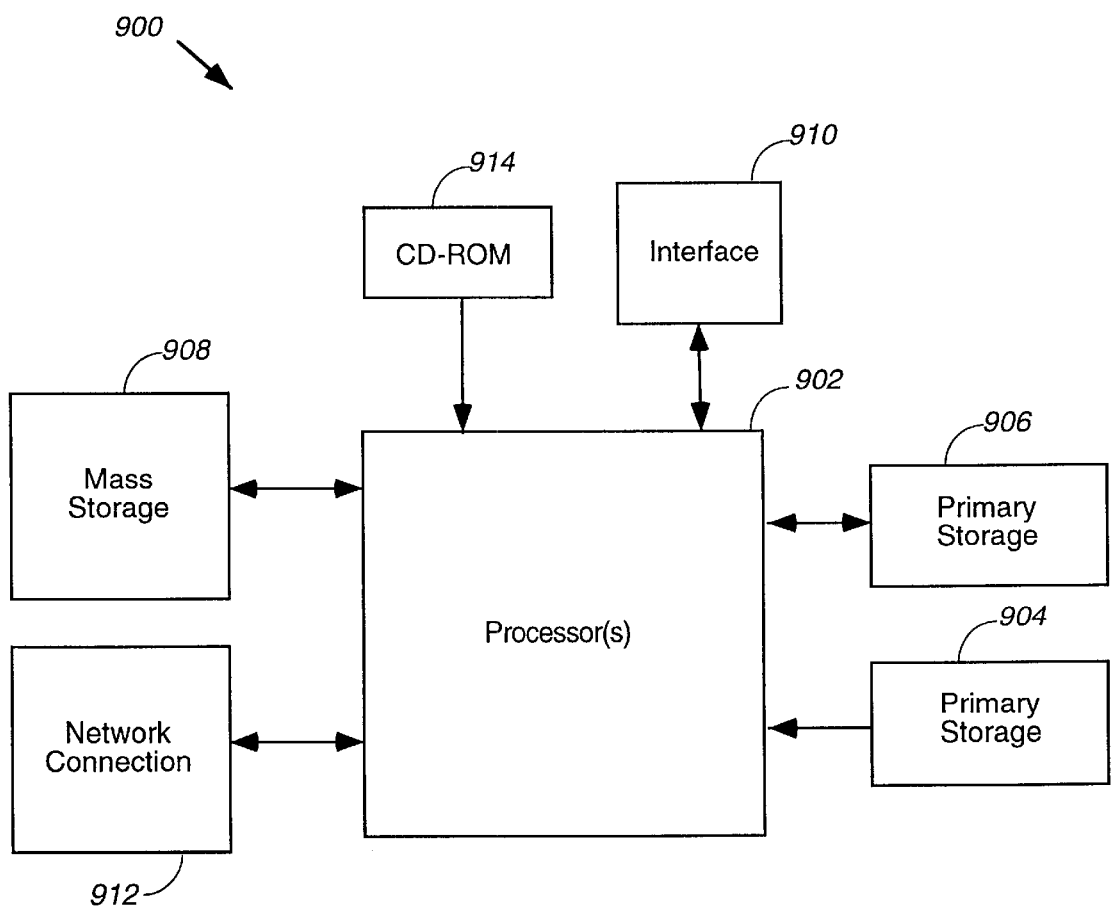
FIG. 6 is a block diagram of a typical computer system suitable for implementing an embodiment of the present invention.

Preparation processing device 154 may be implemented upon any suitable computer system. By way of example, a suitable computer system is shown in FIG. 6 below. In one specific embodiment, device 154 is implemented upon a personal computer. Device 154, as will be described in more detail below, is used to manipulate and store cardholder data, application data, and other data such as parameter data. The cardholder data includes data such as the identification of the cardholder and the credit limit of the cardholder. The application data includes data related to a credit application, a stored value application, or other applications that may or may not require cryptography, such as loyalty applications. A variety of other applications may be available for use on a smart card to be personalized, including debit, dedicated funding source applications, etc. The parameter data includes data not uniquely related to the particular cardholder, such as the number of the card and the location of the issuer.

Transport mechanism 158 may use any of the numerous, well-known file transfer methods for transferring file 160. By way of example, transfer via a floppy disk or over a secure network connection may be used. Personalization device 150 may be any suitable personalization machine such as are known in the art. By way of example, those machines made and used by Datacard, Inc. may be used. As is known in the art, device 150 includes any number of processing modules for personalizing various aspects of a smart card. Module identifier codes embedded in output file 160 indicate following data which is to be used by the appropriate processing module to personalize a smart card.

Figure 2:
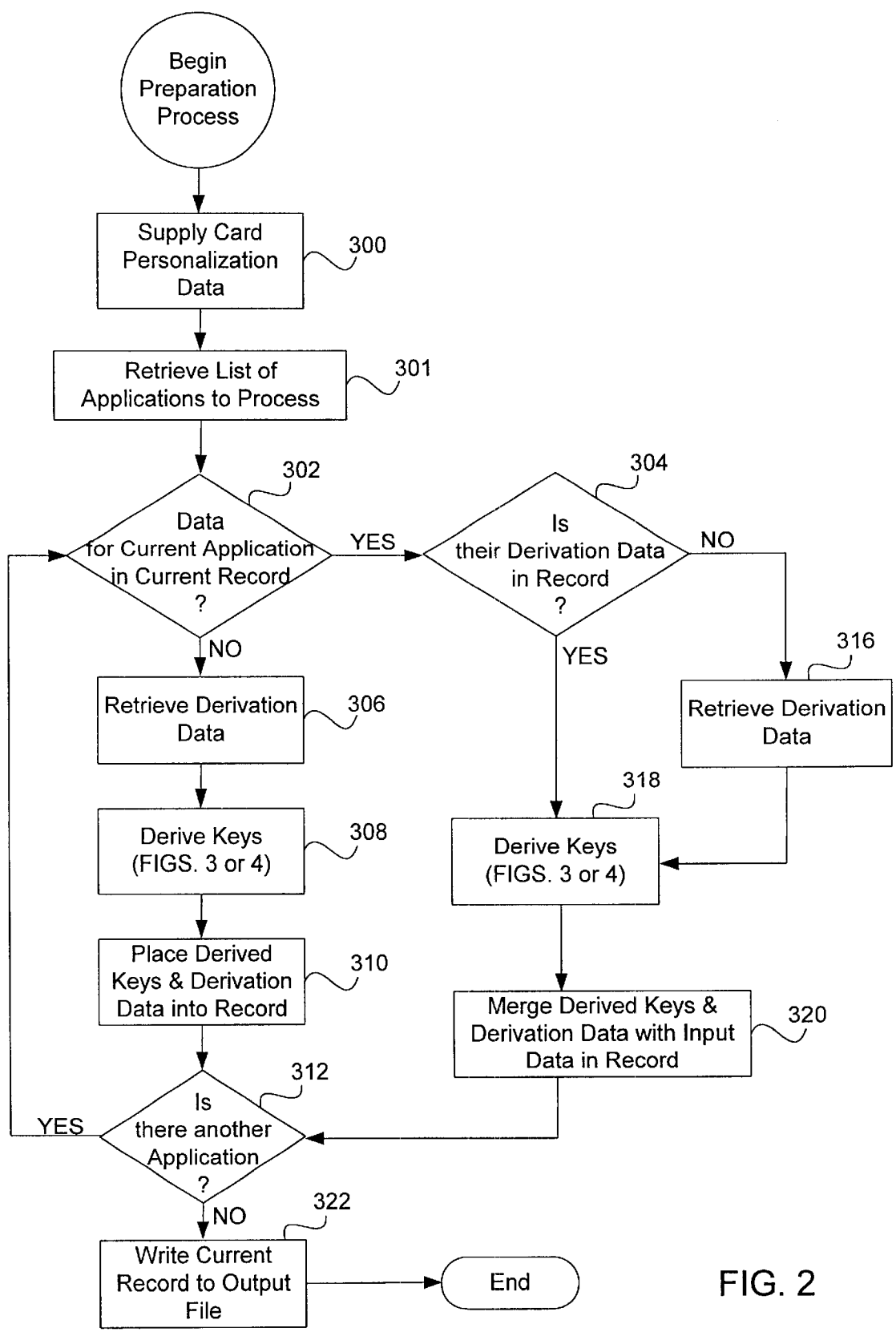
FIG. 2 is a flowchart of one method for performing a preparation process to produce an output file at a preparation processing device.
Figures 3, 4:
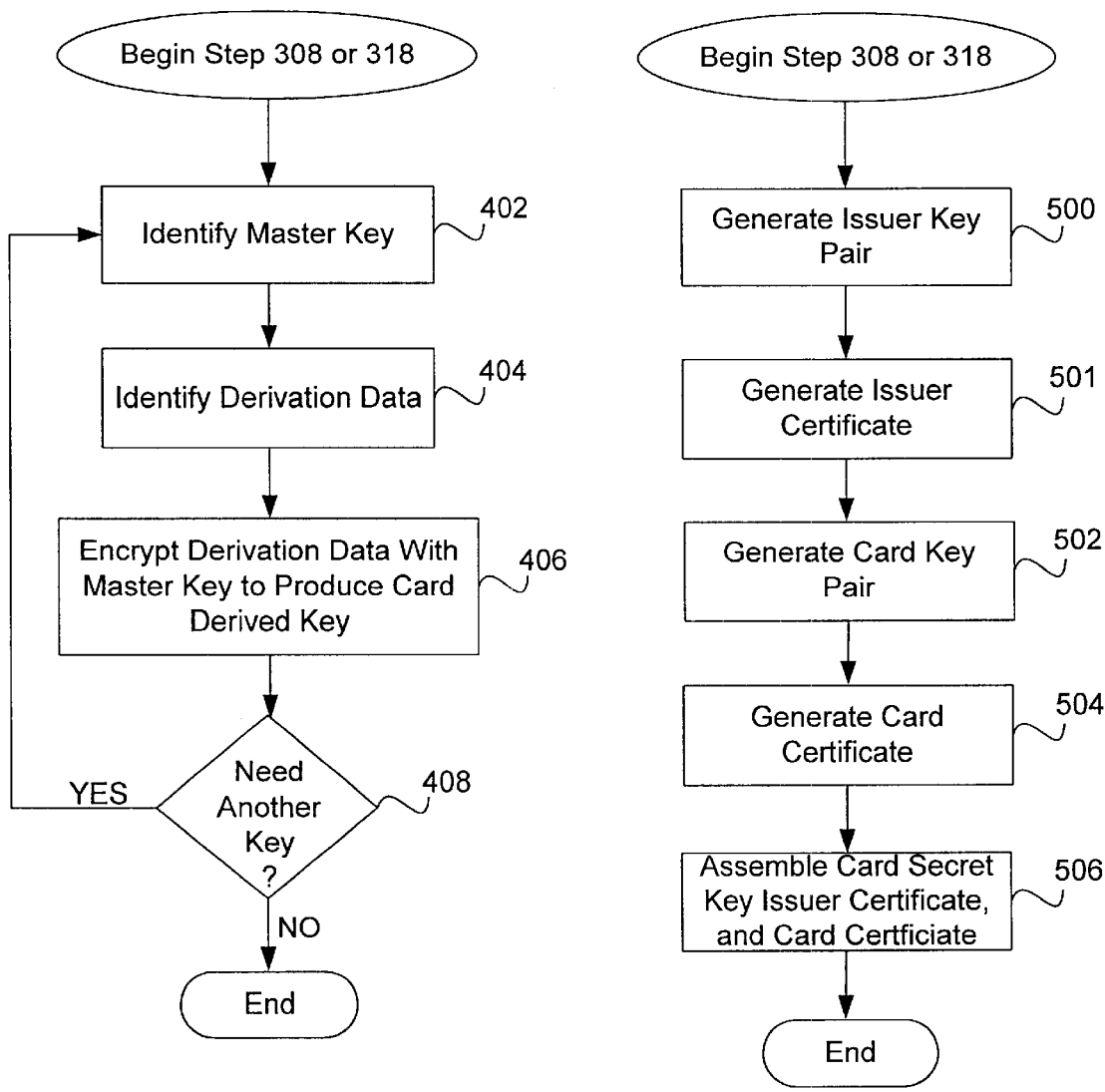
FIG. 3 is a flowchart describing one method for deriving keys using symmetric cryptography.
FIG. 4 is a flowchart describing another method for deriving keys using asymmetric cryptography.

According to one embodiment of the invention, prior to undergoing the standard personalization process at the personalization location, input data for each smart card to be personalized is processed using preparation processing device 154 at the issuer's location. FIGS. 2, 3 and 4 describe one embodiment by which input data for a smart card is processed using device 154. Preparation processing device 154 produces output file 160, which includes data to be used in the personalization process for all cards to be personalized. File 160 is described in greater detail below in FIGS. 5A–5D. Data in output file 160 may include: data for any of a variety of applications such as credit, stored value, loyalty, etc.; derived card keys and derivation data for particular applications; public key certificates; and other data. Resulting output file 160 is then transferred to personalization device 150 via transport mechanism 158.

In one embodiment of the invention, input file 159 has the format of output file 160, although not all needed information is yet present in the file. For example, as noted earlier, a wide variety of information is passed to the personalization location. Data destined for the magnetic stripe of a card, for embossing on a card, and for graphics on a card may already be present and complete in input file 159 in the format described in FIGS. 5A–5D. Nevertheless, data for a particular application or applications, destined for the chip on the card, may not be entirely complete in input file 159. For example, derived keys, a card secret key, an issuer certificate and a card certificate may not be present in input file 159. As described in FIGS. 2–4, this information is added to output file 160 during the preparation process. Furthermore, an issuer may have different systems (such as an on-line system, a cardholder system, a load system, etc.) from which input data destined for output file 160 is retrieved. For example, data for different applications on the chip card may come from different sources. Thus, output file 160 may be run through the process of FIG. 2 multiple times, each pass generating and adding information to records in the file for different applications.

Once file 160 reaches the personalization location, device 150 processes file 160 using standard processing techniques to personalize the smart cards whose personalization data is represented in file 160. In one embodiment, module identifier codes in file 160 indicate which processing modules are to operate on which data. In particular, non-secret data and secret data (such as derived keys, public key pairs and certificates) for each application available on a smart card is read from file 160 by device 150 and transferred to each smart card being personalized.

Accordingly, when the remainder of the personalization process is performed at the personalization location, personalization device 150 no longer needs to derive card keys, or to generate card key pairs which is typically very time consuming. A further advantage is that the present invention allows an increase in security since the master keys never need to leave the issuer's location or control.

Security Embodiment

Those of skill in the art will appreciate that a wide variety of keys and encryption algorithms may be used by the card supplier, issuer, personalizer, and by the card itself to provide security during card manufacture, transport and personalization. The following presents one possible embodiment for use of a variety of keys to provide security in various aspects of the invention. Of course, a wide variety of other forms of keys may also be used. In this embodiment, the issuer generates various keys to provide security. For example, the issuer may generate: a master load key (KML) used to create a derived unique load key (KDL) for each personalized card; a master update key (KMU) used to create a derived unique update key (KDU) for each personalized card; an issuer transport key (ZCMK); a supplier update key (KMC) used to create a derived unique supplier update key (KDC) for each personalized card; a key version update (VKUiep) which is initialized to the key version of the KMC used to create the initial diversified key for update transactions for a card; and a key encryption key (KEK) for sending other keys to the personalization location. KDC is preferably placed on each card by the card supplier for use as a transport key to secure the cards prior to personalization. Key KMC is sent to the supplier and to the personalization location.

HSM 130 is used either to generate or to store imported master keys such as KMU, KML, KMC, KEK, a key exchange key, the issuer public and secret keys, and the issuer public key certificate. HSM 130 also uses the master keys to generate card specific keys such as KDL, KDU, the card public and secret keys, and generates the card public key certificate. HSM 152 is a similar device to HSM 130. HSM 152 is used to decrypt secret data in output file 160 using KEK, and to encrypt the secret data under a key known to the card (for example, a session key) prior to sending it to the card for personalization. HSM 152 also uses KMC to unlock cards received from the card supplier.

In addition, a variety of techniques may be used for protecting secret data (such as keys, certificates, etc.) to be placed onto a card, and these techniques may depend upon the application for which the secret data is generated. As secret data may be generated at the issuer location, instead of at the personalization location, it is preferable to protect this secret data before it is stored onto the card in some fashion. In one embodiment, secret data is encrypted under a key encryption key when generated. Once at the personalization location, HSM 152 decrypts the secret data, re-encrypts it under a personalization key known to the card and then the encrypted secret data is loaded onto the card using personalization device 150. In a second embodiment, secret data is encrypted under a personalization encryption key known to the card when the secret data is generated at the issuer location. Device 150 loads this encrypted data to the card without modification. Other techniques for protecting the secret data may also be used.

Personalization Preparation Process

FIG. 2 is a flowchart of a method according to an embodiment of the present invention for performing a preparation process to produce output file 160 at preparation processing device 154. The flowchart is performed for each record of card data, i.e., for each card to be personalized. In general, a record from input file 159 is moved to output file 160 once new data (for example, derived keys, certificates, etc.) has been added for those applications that require such new data. The data region for an application such as a loyalty application that may not need derived keys may be unaffected by the method of FIG. 2. Preferably, the issuer provides parameters such as an identification of the processing module identifiers to be used (such as chip card, magnetic stripe etc.), and an identification of the chip card applications to be placed into output file 160.

In a first step 300, the issuer supplies card record data to be processed in the form of an input file 159. An issuer may have different systems (such as an on-line system, a cardholder system, a load system, etc.) from which card record data is received. File 159 may be in any suitable format. As mentioned above, preferably input file 159 is in the format as shown in FIGS. 5A–5D. In general, file 159 includes cardholder specific data and application specific data. Application specific data includes application parameters and identifiers of master keys to be used.

The contents of file 159 may also vary depending upon the types of applications to be implemented on cards. For example, a stored value application may not require any cardholder specific data. Many of the data fields will already have values, especially data destined for the magnetic stripe of a card, for embossing on a card, and for graphics on a card. In other words, the data for these particular processing modules may already be present. Nevertheless, data fields that will contain derived keys, certificates, and other secret information for particular applications may not yet be filled. Advantageously, FIG. 2 provides one embodiment for providing this data at the issuer location.

In step 301, a list of applications that need derived keys, a key pair, certificates, and/or other secret information is identified, and this list of applications is retrieved. This list is preferably identified by the issuer and entered into device 154 using any suitable job setup function available on device 154. Steps 302–312 are then performed for each application identified within the context of one record from file 159 corresponding to a smart card to be personalized.

Step 302 determines whether there is any data for the current application in the current record from which derivation data might be obtained. If there is data for the current application in the record, then it is determined whether there is appropriate derivation data in the record for this application in step 304. If there is derivation data in the record, then card keys are derived (and/or key pairs and certificates are produced) in step 318. If there is no derivation data in the record, then the derivation data is retrieved in step 316, and then step 318 is performed. Step 318 will be described in greater detail below with reference to FIGS. 3 and 4. Derivation data may be any suitable information present in the record (or from another location) such as the smart card identifying number. A card number counter within device 154 may also be used as derivation data. Other suitable derivation data that is unique to a particular card may also be used.

Once the card keys have been derived (and/or key pairs and certificates produced) in step 318, the derived keys and derivation data (if necessary) are merged with the rest of the input data already present in the record in step 320. This merger is performed using any of a wide variety of data processing techniques. In one embodiment, the derived keys and/or derivation data are simply placed into the record along with the existing input data. Next, step 312 determines whether there is another application that needs derived keys (and/or key pairs and certificates). If so, control returns to step 302 for this next application to be processed.

In step 302, if it is determined that there is no data for the current application in the current record that might be used as derivation data, then appropriate derivation data is retrieved in step 306. This derivation data may be retrieved in a variety of manners. Preferably, device 154 sequentially generates a unique card number for the current record at this time to serve as derivation data. In step 308 the card keys are then derived (and/or key pairs and certificates produced). Step 308 will be described in greater detail below with reference to FIGS. 3 and 4.

The derived keys and derivation data are then placed into the record in step 310 in the appropriate place for the current application (for example, using the format of FIGS. 5A–5D). Next, step 312 determines whether there is another application that needs derived keys (and/or key pairs and certificates). If so, control returns to step 302 for this next application to be processed.

If, however, there is no other application that needs derived keys (and/or key pairs and certificates), the current record is written into output file 160 in step 322. For applications such as a loyalty application that may not require derived keys, its data is already present in the current record and will be moved into the output file as well. After all records have been processed (corresponding to all smart cards that will later be personalized), file 160 is ready for delivery to personalization device 150 at the personalization location.

Preferably, for an application that uses public key technology, each record in file 160 contains: card specific data such as the card number; the card secret key; the card public key certificate; the issuer public key certificate; and any card derived symmetric keys needed. In various embodiments, the symmetric keys are DES keys. In a preferred security embodiment, a message authentication code (MAC) is also included along with the MAC key used to compute the MAC, and all secret data (including the MAC key) is encrypted under KEK. In one embodiment, this secret data includes any symmetric keys and a representation of the card secret key.

In an alternative embodiment, derived key data (and/or key pairs and certificates) is merged with application data and then written into an output record in steps 310 and 320 instead of being placed directly into the current record of input file 159. In this scenario, application data for applications such as a loyalty application (that may not require derived keys) is written to the output record after step 312, thus effectively merging the loyalty application data with other application data in the output record. The output record may then be written to output file 160 in the same fashion as in step 322. In this fashion, data for applications present in input file 159 that may not require the processing of FIG. 2 is still transferred to output file 160. Advantageously, application data for applications that may not require derived keys (and/or key pairs and certificates), along with personalization data such as magnetic stripe information, embossing information, etc., is effectively merged with application data for applications that do require derived keys (and/or key pairs and certificates). Common output file 160 is thus arranged to hold complete personalization information for any number of cards for a variety of applications.

FIG. 3 is a flowchart describing one embodiment for performing either of steps 308 or 318 of FIG. 2, i.e., one technique for deriving card keys. In the embodiment described in FIG. 3, card keys are derived using symmetric cryptography. By way of example, data encryption standard (DES) or triple DES algorithms may be used. A wide variety of keys may be derived for later use in personalizing a particular card. By way of example, these keys include: a derived load key (KDL) which is used to provide security during the load process and is derived using KML; and a derived update key (KDU) which is used to create session keys during the update process and is derived using KMU.

When deriving card keys, a master key is first identified in step 402. The key can be present in any suitable key storage mechanism that can store the master keys. Preferably, the master key is present within HSM 130. In step 404, derivation data is then identified from the data retrieved above in steps 306 or 316, and delivered to HSM 130. In step 406 the derivation data is encrypted with the master key using HSM 130, thus providing a card derived key. The card derived key may then be transferred from HSM 130 to device 154 for eventual placement into the current record. It is then determined in step 408 whether another derived key is needed as certain applications may require multiple keys. For example, an application may use one key for data verification and a separate key for encryption. If another key is needed, then control returns to step 402. If, however, another key is not needed, then the method ends.

FIG. 4 is a flowchart describing another embodiment for performing either of steps 308 or 318 of FIG. 2, i.e., another technique for deriving card keys. In the embodiment described in FIG. 4, card keys are derived using asymmetric cryptography. By way of example, a public key cryptography method may be used.

In this embodiment, keys are derived using public key techniques. Steps 500 and 501 are preferably executed at a setup time prior to the initiation of the steps shown in FIG. 2. Step 500 generates an issuer key pair (issuer secret key and issuer public key). Preferably, HSM 130 generates the key pair.

Step 501 generates the issuer certificate by sending the issuer public key to a trusted third party and receiving the issuer certificate from the trusted third party. Any trusted third party and certification methods may be used. In one embodiment, the issuer certificate is created by the Visa Certification Authority by encrypting the issuer public key and associated certificate data under a Visa Certification Authority Private Key.

Later, when the derivation of card keys is required (as in steps 308 and 318 of FIG. 2), a card key pair is generated in step 502 (card secret key and card public key). Preferably, HSM 130 generates the card key pair. A card certificate is then generated in step 504 by using the issuer secret key to encrypt the card public key. Preferably, HSM 130 generates the card certificate as well.

The card secret key, issuer certificate and card certificate are then assembled to be placed into the card record in either of steps 310 or 320. Preferably, the card secret key is passed to the personalization process as Chinese Remainder Theorem Constants. The card public key and the issuer public key are preferably present within their respective certificates in any suitable form. Any portion of either public key that does not fit within its certificate is preferably placed onto the card as well, such that each public key is represented on the card.

The derivation of issuer and card keys and the creation of the certificates can be accomplished by using well known RSA cryptographic methods. Preferably, generation of issuer and card key pairs use RSA with a public key exponent of 3 or of $2^{16}+1$. Both the symmetric cryptographic card key derivation shown in FIG. 3 and the asymmetric cryptographic card key derivation shown in FIG. 4 may be utilized with the embodiment shown in FIG. 2.

FIGS. 5A–5D illustrate one possible embodiment of a format for output file 160. Output file 160 is provided by the issuer to the entity performing personalization of smart cards. Output file 160 may be implemented in many ways and have a wide variety of formats. The description below provides one suitable format that has been found to work well.

A wide variety of types of data may be included within output file 160 to be used during personalization. By way of example, data types include data to be embossed on cards, data to be encoded on the magnetic stripe and graphic data to be printed on the card. For the personalization of chips on smart cards, an additional type of data is included, which is data for an application on the chip. The following illustrates a suitable format for placing multiple application data in output file 160. By way of background, it is instructive to note that a typical personalization device 150 includes a series of processing steps or processing modules which perform personalization tasks. Each processing module uses data from the input record for a particular card to perform its task for that card. In this embodiment, the data for a particular processing module is identified by a module identifier code (MIC). In general, each MIC is followed by the data to be processed for that processing module. For example, one particular processing module performs the task of placing data onto the chip within a smart card. This module has a corresponding module identifier code (MIC).

FIG. 5A illustrates an embodiment of output file 160. Included within file 160 are a series of records 602–606 that each contain personalization data for a particular smart card to be personalized. Any number of other records 608 may also be included in the file.

FIG. 5B illustrates an example of a card record 602 from file 160. Record 602 generally has the format of an MIC followed by the data to be used by the processing module identified by the MIC. MIC 610 indicates a particular processing module. Data length 612 indicates the length of the data 614 that is associated with MIC 610. When this record is read by personalization device 150, data 614 is used by the appropriate processing module identified by MIC 610 to personalize the card identified in record 602. In a similar fashion, MIC 616, data length 618 and data 620 provide data for a different processing module identified by MIC 616 that is used to personalize the same card. Any number of other groups 622 of MICs and data may also be present within record 602. One MIC will identify a processing module that is to use the data corresponding to that MIC to be placed on the chip within the smart card. In this example, MIC 616 identifies data to be placed on a chip for any number of card applications.

FIG. 5C illustrates data field 620 to be used by a processing module to place the data onto the chip of a smart card. Data 620 may contain data, identifiers, and keys for any number of applications on the card. In this embodiment, application data 620 includes the following information. Application identifier 630 identifies a first application present on the card. Data length 632 indicates the total length of subsequent information for that application including key 634, data 636, a MAC key and the MAC itself. KEK identifier 634 is an identifier for the key encryption key (KEK) used to encrypt any secret data for this first application. In one embodiment, KEK identifier 634 includes an issuer identifier and a version identifier for the KEK. Application data 636 is a variable length field that includes any and all application data needed to personalize a card for a particular application. In one embodiment, a MAC is used along with application data 636. In this embodiment, application data 636 is followed by a key used to compute the MAC. Preferably, this key is encrypted under the KEK. Following this key is the MAC itself which is computed using the fields starting with application identifier 630 up through and including the key used to compute the MAC.

Data 620 associated with MIC 616 may also contain application data for any number of applications that may be present on the smart cards to be initialized. Thus, in a similar fashion, application identifier 640, data length 642, KEK identifier 644 and application data 646 identify a second application and data to be provided for that application during personalization. Any number of other identified applications 650 and their corresponding data may also be present within data 620.

FIG. 5D illustrates one possible format for application data 636 of FIG. 5C. It should be appreciated that data and keys for an application may be stored within field 636 in a wide variety of manners. By way of example, one technique that uses the tag-length-value triplets will now be described.

In this format, data for an application is represented by tag-length-value triplets, each triplet representing a piece of information. For example, tag 70 is a variable length field identifying a particular type of information, length 672 indicates the length of the data, and value 674 provides the data itself. In a similar fashion, tag 680, length 682 and value 684 provide another piece of information for use by the first application. Optionally, another field that indicates the total length of all of the tag-length-value data may be added to field 636.

A wide variety of fields (represented by a tag, a length and a value) may be present within application data 636. In one specific embodiment of the invention, output file 160 supports both a stored value application and a credit/debit application. In this specific embodiment, tags for the stored value application are found in Visa International *Specifications For Reloadable Stored Value Cards With Public Key Technology,* Visa International, 1996; tags for the credit/debit application may be found in *Visa Integrated Circuit Card Specification,* referenced above. Of course, a wide variety of other tags for other applications may also be used. In general, these fields of application data 636 provide information to the personalization process such as non-secret cardholder data, derived encryption keys that include, encryption algorithms, security instructions, control numbers that ensure correct version of keys are used, message authentication codes, etc.

In one specific embodiment in which cards to be personalized include a stored value application, the record for a particular card contains the following fields: the card secret key (expressed as Chinese Remainder Theorem Constants); an issuer certificate; a card certificate; card data; and a MAC signature for the record. Card data includes: an application identifier for an intersector electronic purse (IEP); authentication mode required by an IEP; application profile of an IEP; balance of an IEP; maximum balance of an IEP; card secret key (as Chinese Remainder Theorem Constants); card supplier identifier of an IEP; currency exponent for an IEP; currency of an IEP; activation date of an IEP; deactivation date of an IEP; expiration date of an IEP; purse provider certificate; identifier for an IEP; diversified key for load transactions; diversified key for update transactions; type of EF; version of the IEP; key version of the IEP; and a certificate authority public key index.

Computer System Embodiment

FIG. 6 illustrates a computer system 900 suitable for implementing an embodiment of the present invention. Computer system 900 includes any number of processors 902 (also referred to as central processing units, or CPUs) that are coupled to storage devices including primary storage 906 (such as random access memory, or RAM) and primary storage 904 (such as a read only memory, or ROM). As is well known in the art, primary storage 904 acts to transfer data and instructions uni-directionally to the CPU and primary storage 906 is used typically to transfer data and instructions in a bi-directional manner. Both of these primary storage devices may include any suitable of the computer-readable media described below. A mass storage device 908 is also coupled bi-directionally to CPU 902 and provides additional data storage capacity and may also include any of the computer-readable media described below. Mass storage device 908 may be used to store programs, data and the like and is typically a secondary storage medium (such as a hard disk) that is slower than primary storage. It will be appreciated that the information retained within mass storage device 908, may, in appropriate cases, be incorporated in standard fashion as part of primary storage 906 as virtual memory. A specific mass storage device such as a CD-ROM 914 passes data uni-directionally to the CPU.

CPU 902 is also coupled to an interface 910 that includes one or more input/output devices such as such as video monitors, track balls, mice, keyboards, microphones, touch-sensitive displays, transducer card readers, magnetic or paper tape readers, tablets, styluses, voice or handwriting recognizers, biometrics readers, or other computers. CPU 902 optionally may be coupled to another computer or telecommunications network using a network connection as shown generally at 912. With such a network connection, it is contemplated that the CPU might receive information from the network, or might output information to the network in the course of performing the above-described method steps.

Furthermore, method embodiments of the present invention may execute solely upon CPU 902 or may execute over a network connection such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter.

Although the foregoing invention has been described in some detail for purposes of clarity of understanding, it will be apparent that certain changes and modifications may be practiced within the scope of the appended claims. For instance, entities other than an issuer and a personalizer may perform the functions that the issuer and personalizer normally perform. Input to the preparation processing device may be in the form of records in an input file, or any other suitable format from an issuer information system. The preparation processing device may itself create the records in the output file. A wide variety of secret information (including master keys, encryption algorithms, public key pair generation information, etc.) may be used at the issuer location to create the output file, thus obviating the need for the secret information to be transferred to a personalizer. Any number and types of application programs may be personalized using the present invention; the format of the output file is flexible enough to contain a variety of data for each application. Therefore, the described embodiments should be taken as illustrative and not restrictive, and the invention should not be limited to the details given herein but should be defined by the following claims and their full scope of equivalents.

We claim:

1. A method of personalizing a smart card comprising:
   identifying an input file having card record data, said input file being present at a first location;
   identifying an input record of said input file having derivation data associated with said smart card;
   deriving a first derived card key at said first location using said derivation data, said first derived card key for use with a first application on said smart card;

placing said first derived card key in an output record in a data area corresponding to said first application, said output record corresponding to said smart card and said element of placing occurring at said first location; and sending said output record including said first derived card key to a second location, whereby a personalization process at said second location uses said output record to personalize said smart card with said first derived card key.

2. A method as recited in claim 1 wherein said first location is an issuer location and said second location is a personalization location.

3. A method as recited in claim 1 wherein said element of deriving includes:

retrieving a master key from a secure device;

deriving said first derived card key with said master key using said derivation data corresponding to said smart card, whereby said first derived card key is unique to said smart card.

4. A method as recited in claim 1 further comprising:

generating a card key pair at said first location, including a card public key and a card secret key;

generating a card certificate at said first location; and placing said card secret key and said card certificate in said output record, said element of placing occurring at said first location.

5. A method as recited in claim 1, wherein said input record from an issuer system includes personalization data for said smart card, said method further comprising:

merging at said first location said personalization data from said input record with said first derived card key to form said output record for sending to said second location.

6. A method as recited in claim 1 wherein a plurality of applications are available for use on said smart card, said method further comprising:

deriving a plurality of keys at said first location, each of said derived keys corresponding to one of said applications; and placing each of said derived keys in said output record in a data area corresponding to the application to which said key corresponds, whereby said personalization process at said second location uses said output record to personalize said smart card for said applications using said derived keys.

7. A method as recited in claim 1 wherein said first location and second location are the same location.

8. A method of personalizing a smart card comprising:

identifying an input file having card record data, said input file being present at an issuer location;

identifying an input record of said input file having derivation data associated with said smart card;

retrieving a master key from a secure device at said issuer location;

deriving a first derived card key with said master key using said derivation data corresponding to said smart card, said first derived card key for use with a first application on said smart card;

placing said first derived card key in an output record in a data area corresponding to said first application, said output record corresponding to said smart card; and sending said output record including said first derived card key to a personalizer, whereby a personalization process at said personalizer uses said output record to personalize said smart card with said first derived card key for said first application.

9. A method as recited in claim 8 further comprising:

generating a card public key and a card secret key at said issuer location;

generating a card certificate at said issuer location, said card public key, said card secret key and said card certificate for use with a second application on said smart card; and placing said card secret key and said card certificate in said output record in a data area corresponding to said second application, whereby said personalization process at said personalizer uses said record to personalize said smart card for said second application as well as for said first application.

10. A method as recited in claim 8, wherein said input record from an issuer system includes personalization data for said smart card, and said method further comprising:

merging at said issuer location said personalization data from said input record with said first derived card key to form said output record for sending to said personalizer.

11. A method as recited in claim 8 wherein a plurality of applications are available for use on said smart card, said method further comprising:

deriving a plurality of keys at said issuer location, each of said derived keys corresponding to one of said applications; and placing each of said derived keys in said output record in a data area corresponding to the application to which said key corresponds, whereby said personalization process at said personalizer uses said output record to personalize said smart card for said applications using said derived keys.

12. A method as recited in claim 8 wherein said personalizer is located at said issuer location.

13. A method of personalizing a smart card comprising:

identifying an input file having card record data, said input file being present at an issuer location;

identifying an input record of said input file having derivation data associated with said smart card;

generating a card public key and a card secret key at said issuer location;

generating a card certificate, said card public key, said card secret key and said a card certificate for use with a first application on said smart card;

placing said card secret key and said card certificate in an output record in a data area corresponding to said first application, said output record corresponding to said smart card; and sending said output record including said card secret key and said card certificate to a personalizer, whereby a personalization process at said personalizer uses said output record to personalize said smart card for said first application.

14. A method as recited in claim 13 further comprising:

retrieving a master key from a secure device at said issuer location;

deriving a first derived card key with said master key using said derivation data corresponding to said smart card; and placing said first derived card key in said output record.

15. A method as recited in claim 13, wherein said input record from an issuer system includes personalization data for said smart card, and said method further comprising:

merging at said issuer location said personalization data from said input record with said card secret key and said card certificate to form said output record for sending to said personalizer.

16. A method as recited in claim 13 wherein a plurality of applications are available for use on said smart card, said method further comprising:

deriving a plurality of keys at said issuer location, each of said derived keys corresponding to one of said applications; and placing each of said derived keys in said output record in a data area corresponding to the application to which said key corresponds, whereby said personalization process at said personalizer uses said output record to personalize said smart card for said applications using said derived keys.

17. A method as recited in claim 13 wherein said personalizer is located at said issuer location.

18. A system for personalizing a plurality of smart cards comprising:

an input file including a plurality of records, each record corresponding to one of said smart cards and including information about said one of said smart cards;

a hardware security module arranged to produce secret keys for said smart cards;

a preparation processing device coupled to said hardware security module and in communication with said input file, said preparation processing device being arranged to produce secret keys for said smart cards using said hardware security module, and to merge said secret keys with said information in said records of said input file; and an output file produced by said preparation processing device and suitable for use in a personalization process, said output file including a plurality of records, each record corresponding to one of said smart cards and including said information about said one of said smart cards merged with at least one secret key of said secret keys, whereby said output file is used by a personalizer to personalize said smart cards.

19. A system as recited in claim 18 wherein said system is located at an issuer location.

20. A system as recited in claim 18 wherein said hardware security module is arranged to store master keys associated with said smart cards and to derive derived card keys with said master keys using derivation data corresponding to said smart cards, whereby a unique derived card key is produced for each smart card and may be placed into one of said records of said output file.

21. A system as recited in claim 18 wherein said hardware security module is arranged to generate a card key pair and a card certificate for each of said smart cards, whereby a card secret key of said card key pair and said card certificate may be placed into one of said records of said output file.

22. A system as recited in claim 18 wherein a plurality of applications are available for use on each of said smart cards, wherein said hardware security module is further arranged to produce at least one secret key for each of said applications for each smart card, wherein said preparation processing device is further arranged to merge said produced secret keys with said information of said input records, and wherein each record of said output file includes a data area for each of said applications into which a corresponding secret key may be placed, whereby said personalization process at said personalizer uses said output file to personalize said smart cards for said applications.

23. A method of personalizing smart cards at a personalization location, said method comprising:

receiving an output file which includes a plurality of records, each record including personalization information for one of said smart cards, said personalization information for one of said smart cards including non-secret information and encrypted keys;

personalizing a first one of said smart cards using said non-secret information from a first one of said records corresponding to said first smart card;

decrypting said encrypted keys from said first record using a hardware security module; and storing said decrypted keys in said first smart card, whereby said output file is used to personalize said smart cards at said personalization location without the need for said personalization location to produce said keys.

24. A method as recited in claim 23 wherein said encrypted keys include derived card keys produced using a master key at an issuer location.

25. A method as recited in claim 23 wherein said encrypted keys include a card secret key for use with public key encryption and a card certificate for each smart card, said card secret key and said card certificate being produced at an issuer location.

26. A method as recited in claim 23 wherein each of said smart cards includes a plurality of applications available for use, and wherein said personalization information for each of said smart cards includes at least one key for each of said applications, said method further comprising:

decrypting keys for each of said applications from said first record corresponding to said first smart card; and storing said decrypted keys for each of said applications in said first smart card, each decrypted key being stored in said smart card in association with its corresponding application, whereby said output file is used to personalize said plurality of applications on said smart cards at said personalization location without the need for said personalization location to produce keys for each of said applications.

27. A computer-readable medium comprising computer code for personalizing a smart card, said computer code of said computer-readable medium effecting the following:

identifying an input file having card record data, said input file being present at a first location;

identifying an input record of said input file having derivation data associated with said smart card;

deriving a first derived card key at said first location using said derivation data, said first derived card key for use with a first application on said smart card;

placing said first derived card key in an output record in a data area corresponding to said first application, said output record corresponding to said smart card and said element of placing occurring at said first location; and sending said output record including said first derived card key to a second location, whereby a personalization process at said location uses said output record to personalize said smart card with said first derived card key.

28. A computer-readable medium comprising computer code for personalizing smart cards at a personalization location, said computer code of said computer-readable medium effecting the following:

receiving an output file which includes a plurality of records, each record including personalization information for one of said smart cards, said personalization information for one of said smart cards including non-secret information and encrypted keys;

personalizing a first one of said smart cards using said non-secret information from a first one of said records corresponding to said first smart card;

decrypting said encrypted keys from said first record using a hardware security module; and storing said decrypted keys in said first smart card, whereby said output file is used to personalize said smart cards at said personalization location without the need for said personalization location to produce said keys.

* * * * *